United States Patent Office 3,416,937
Patented Dec. 17, 1968

3,416,937
GLASS COMPOSITION FOR USE AS THE FACE PLATE OF AN IMAGE ORTHICON TUBE AND THE LIKE
Goro Enomoto, Sagamihara-shi, Japan, assignor to Kabushiki Kaisha Ohara Kogaku Garasu Seizosho, Sagamihara-shi, Kanagawa-ken, Japan
No Drawing. Filed Feb. 5, 1965, Ser. No. 430,755
1 Claim. (Cl. 106—54)

This invention relates to borosilicate glass which is particularly suitable for use in manufacture of the face plate glass of an image orthicon tube and the like.

To be suitable for such purpose, a glass should possess a thermal expansion coefficient to match that of Kovar or such alloys, a sufficient chemical durability for acid treatment and a homogeneous optical quality without blister, striae or stain, because a face plate glass is made to adhere to the bulb glass sealing to Kovar or such alloys, and then to receive acid and heat treatment. In the image orthicon tube, an optical image is projected on the front surface of the photocathode through a face plate glass.

Kovar or such alloys mentioned above consist of iron, nickel and cobalt and have a thermal coefficient of linear expansion of about 45 to about $54 \times 10^{-7}$ cm./cm./° C. between a room temperature and 450° C. Therefore, both bulb glass and face plate glass are required to have an approximately equal thermal expansion coefficient with that of alloys mentioned above.

As glass to be used for this purpose, it is known that borosilicate glass is suitable, which contains more than 12% boric oxide, less than 10% total alkali metal oxides and alkaline earth metal oxides, and a few percent of alumina. When the content of boric oxide exceeds about 12%, however, boric oxide is liable to volatilize partially and therefore striae are produced. As the result, it becomes difficult to produce homogeneous glass and, in addition, the glass obtained possesses a relatively diminished chemical durability. So, in order to improve the acid resistance, the addition of alumina is effective, but if the quantity of added alumina increases, the glass becomes difficult to melt.

On the other hand, much reduction of the content of boric oxide increases the thermal expansion coefficient of glass and makes it unsuitable for the purpose of this invention.

I have found that, by substituting boric oxide with antimony trioxide, it is possible to reduce the quantity of boric oxide without any disadvantageous effect on the thermal expansive property, and to obtain a chemically stable and homogeneous glass, and this glass is particularly suitable for the face plate of an image orthicon tube.

It is also possible to make a more stable glass by adding a few percent in all of lead oxide, zinc oxide and calcium oxide and by allowing the glass to contain, as alkali metal oxide, an approximately equal quantity of potassium oxide and sodium oxide. It is known that potassium oxide influences the thermal expansive property to a lower extent than does sodium oxide and, in addition, serves to raise the transformation point of the glass. The addition of a small quantity of calcium oxide raises the transformation point, too, and improves the chemical durability. These characteristics are advantageous for the purpose of this invention, too. This invention is characterized by the production of homogeneous and chemically stable face plate borosilicate glass containing less than 12% boric oxide, more than 5% antimony trioxide and at least 3% potassium oxide. Thus obtained glass possesses a thermal coefficient of linear expansion of 45 to $54 \times 10^{-7}$ cm./cm./° C. between 30° C. and 380° C. and has excellent chemical durability. In addition it does not absorb the light in visible range at all and it has a refractive index range of 1.500 to 1.505. Accordingly, it is also possible to use it as optical glass and it is also suitable for reflex mirror glass.

The composition of glass to be produced according to this invention is by weight in the range of 67 to 70% silica, 9 to 12% boric oxide, 2 to 2.3% alumina, 5 to 8% antimony trioxide, 2.5 to 3.0% lead oxide, 0 to 2.0% calcium oxide, 0 to 3.0% zinc oxide, 3.0 to 4.5% sodium oxide, and 3.0 to 4.0% potassium oxide.

The following table shows two examples of glass compositions in accordance with the invention in percent by weight. The melting temperatures, the thermal coefficient of linear expansion over the temperature range 30° C. to 380° C. and the transformation points are also given in the table.

TABLE

|  | (1) | (2) |
|---|---|---|
| $SiO_2$ | 68.96 | 67.98 |
| $B_2O_3$ | 11.59 | 11.71 |
| $Al_2O_3$ | 2.26 | 2.27 |
| $Sb_2O_3$ | 5.41 | 6.12 |
| PbO | 2.58 | 2.58 |
| CaO | 0.35 | 0.18 |
| ZnO | 1.59 | 1.59 |
| $Na_2O$ | 4.13 | 4.13 |
| $K_2O$ | 3.14 | 3.34 |
| Melting temp., ° C | 1,480 | 1,460 |
| Exp. coeff. $\times 10^{-7}$ cm./cm./° C | 50.3 | 51.5 |
| Transformation pt., ° C | 535 | 520 |

I claim:
1. The glass, suitable for the face plate of an image orthicon tube, having a thermal coefficient of linear expansion of 45 to $54 \times 10^{-7}$ cm./cm./° C. between 30° C. and 380° C., and consisting essentially of the following ingredients in percent by weight; 67 to 70% $SiO_2$, 9 to 12% $B_2O_3$, 2 to 2.3% $Al_2O_3$, 5 to 8% $Sb_2O_3$, 2.5 to 3.0% PbO, 0 to 2%, CaO, 0 to 3% ZnO, 3.0 to 4.5% $Na_2O$ and 3.0 to 4.0% $K_2O$.

References Cited

UNITED STATES PATENTS

| 1,545,508 | 7/1925 | Montgomery | 106—54 |
| 2,099,602 | 11/1937 | Fischer | 106—54 |
| 2,937,100 | 5/1960 | Oldfield et al. | 106—54 |

TOBIAS E. LEVOW, *Primary Examiner.*

R. D. EDMONDS, *Assistant Examiner.*

U.S. Cl. X.R.—

106—49